United States Patent
Huang et al.

[11] Patent Number: 6,166,844
[45] Date of Patent: Dec. 26, 2000

[54] TRANSMISSION ROPE FOR MOVABLE MIRROR MODULES OF AN IMAGE SCANNING DEVICE

[75] Inventors: Yin-Chun Huang; Chih-Wen Huang, both of Hsinchu; Jen-Shou Tseng, Miaoli Hsien, all of Taiwan

[73] Assignee: Umax Data Systems Inc., Hsinchu, Taiwan

[21] Appl. No.: 09/373,607

[22] Filed: Aug. 13, 1999

[51] Int. Cl.[7] .................................................. G02B 26/08
[52] U.S. Cl. .......................... 359/212; 359/196; 359/201
[58] Field of Search ................................... 359/212, 201, 359/202, 223, 196; 399/211, 202; 358/474, 494, 496, 497

[56] References Cited

U.S. PATENT DOCUMENTS 5,640,263 6/1997 Sonoda ..................................... 359/196

Primary Examiner—James Phan
Attorney, Agent, or Firm—Dougherty & Troxell

[57] ABSTRACT

A transmission rope for driving movable mirror modules of an image scanning device is disclosed. One end of the transmission rope is located at a locating member. The other end of the transmission rope is first wound on a guide wheel of the second movable mirror module and then held by a rope holder of the first movable mirror module and then the transmission rope is sequentially traveled through several auxiliary guide wheels and a driving motor and then wound back onto the guide wheel of the second movable mirror module and finally fixed at a tension adjuster. The section of the transmission rope between the rope holder of the first movable mirror module and the guide wheel of the second movable mirror module and between the guide wheel of the second movable mirror module and the locating member has better tensile strength than that of the other section of the transmission rope so as to minimize the length deformation during driving the first and second movable mirror modules.

2 Claims, 7 Drawing Sheets

TRANSMISSION ROPE FOR MOVABLE MIRROR MODULES OF AN IMAGE SCANNING DEVICE

BACKGROUND OF THE INVENTION

1. Field of the Invention

The present invention relates to an improved transmission rope structure, and more particularly to a transmission rope structure applicable to an image scanning device for driving the movable mirror modules thereof. The transmission rope is able to minimize the length deformation of the transmission rope during driving the movable mirror modules.

2. Description of the Prior Art

In a conventional image scanning device, in order to achieve the scanning function for a document to be scanned, there is provided with movable mirror modules in the image scanning device. For moving the movable mirror modules, a transmission mechanism including several auxiliary guide wheels and guide wheels is used to drive the movable mirror modules via a transmission rope. When the driving motor operates, via the transmission rope and the relevant components, the movable mirror modules are driven and moved for optically scanning the document positioned on a document positioning plate. In general, the transmission rope is made of steel material.

FIG. 1 is a perspective view showing a conventional image scanning device 1 comprising a focusing lens 2, a left guide rod 31, a right guide rod 32, a first movable mirror module 4, and a second movable mirror module 5. A transmission mechanism is arranged to drive and move the first and second movable mirror modules 4, 5 via a transmission rope L along the guide rods 31, 32. One end of the transmission rope L is fixed at a locating member 8 which is normally positioned at a suitable position of an inner side wall of the casing of the image scanning device 1.

The transmission rope L is first wound on a guide wheel 51 of the second movable mirror module 5 and then held by a rope holder 41 mounted on an end portion of the first movable mirror module 4. Thereafter, the transmission rope L sequentially travels through a first auxiliary guide wheel 71, a driving motor 6, a second auxiliary guide wheel 72 and a third auxiliary guide wheel 73 and then travels back onto the guide wheel 51 of the second movable mirror module 5. Finally, the transmission rope L travels through a fourth auxiliary guide wheel 74 and then fixed at a tension adjuster 9 which may be positioned on an inner side wall of the casing of the image scanning device or other suitable position. In such arrangement, when the driving motor 6 operates, via the transmission rope L, the first and second movable mirror modules 4, 5 can be driven to move at a predetermined displacement ratio.

The above conventional transmission rope structure has been used for many years in this field. However, in practical application, a deflection and vibration will take place to the movable mirror modules when moving. Many factors resulting in the deflection and vibration of the movable mirror modules have been found by analysis. It is noted that the mechanical tension strain to the transmission rope is a very important factor. The tension strain causes a length deformation to the transmission rope during driving the movable mirror modules. According to the analysis based on technical principle and material mechanics, the tension strain A L of the transmission rope is:

$$\Delta L = \frac{FL}{EA}$$

wherein: $\Delta L$: length deformation of the transmission rope L: total length of the transmission rope F: transmission force applied to the transmission rope along the axial direction thereof E: rigidity coefficient of the transmission rope A: area of the transmission rope suffering the driving force.

It is possible to limit the length deformation by means of improving the transmission rope structure so as to solve the problem of the deflection and vibration to the movable mirror modules. FIG. 2 is a plane view showing the arrangement of the transmission rope and the transmission mechanism therefor. It is found that some of the sections of the transmission rope have a fixed length and some of the sections are those sections which will not affect the optical path length, while some other sections have length varying with the displacement of the movable mirror modules. For example, the lengths of the section L1 of the transmission rope between the rope holder 41 of the first movable mirror module 4 and the guide wheel 51 of the second movable mirror module 5 and the section L2 of the transmission rope between the guide wheel 51 of the second movable mirror module 5 and the locating member 8 will vary with the displacement of the two movable mirror modules 4, 5. When the length deformation of the two sections L1, L2 exceeds a predetermined value, the scanning quality of the image scanning device will be greatly affected.

SUMMARY OF THE INVENTION

It is therefore a primary object of the present invention to provide an improved transmission rope structure applied to an image scanning device, which is able to minimize the tension strain of the transmission rope during driving the optical path movable mirror modules of the image scanning device.

In order to achieve the above object, a section of the transmission rope between the rope holder of the first movable mirror module and the guide wheel of the second movable mirror module and between the guide wheel of the second movable mirror module and the locating member is formed by at least two transmission ropes or has a larger diameter so as to provide a greater tensile strength to the transmission rope during driving the first and second movable mirror modules.

The present invention can be best understood through the following description and accompanying drawings wherein:

DETAILED DESCRIPTION OF THE PREFERRED EMBODIMENTS

Figure 1:
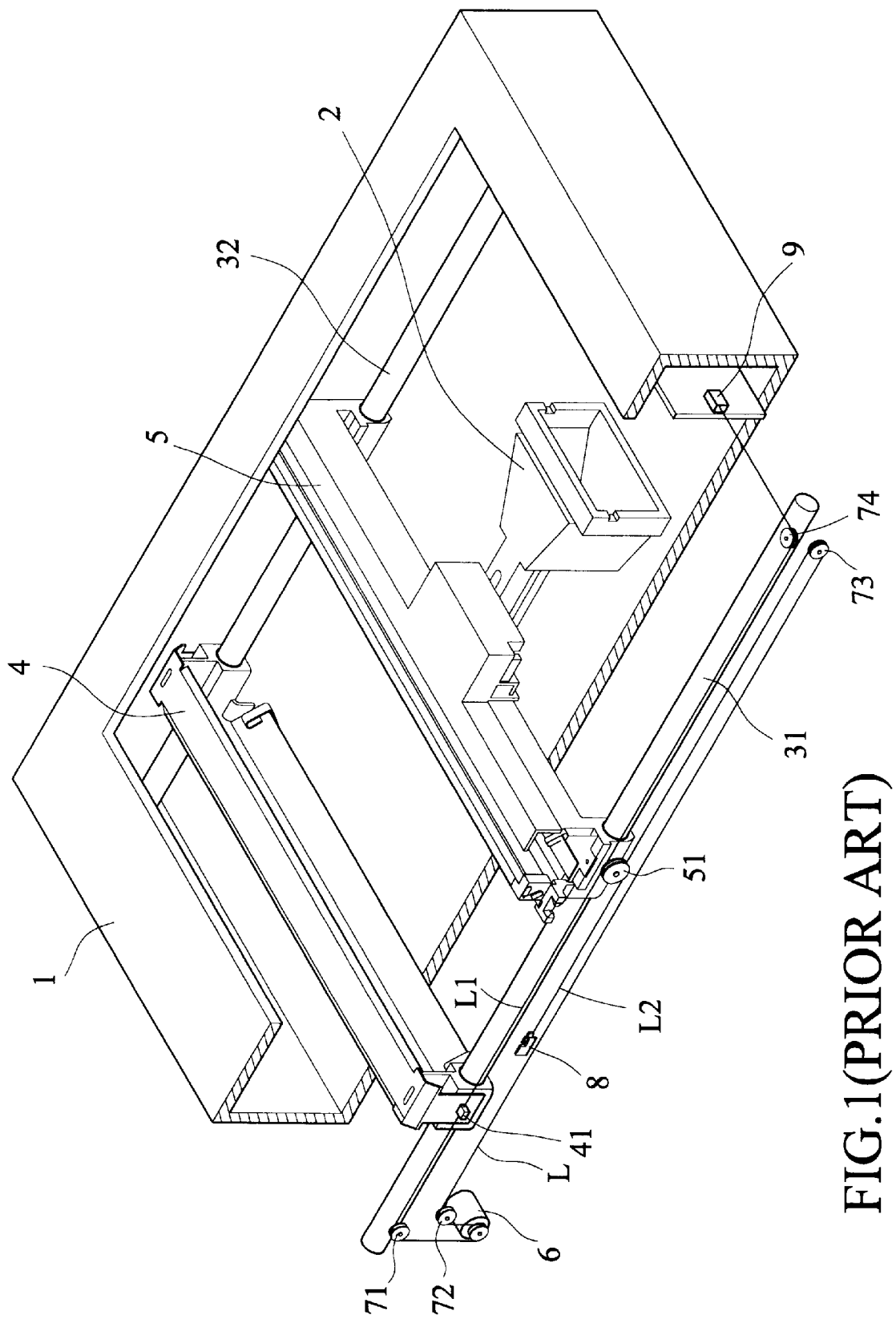
FIG. 1 is a perspective view showing the arrangement of the respective main components of a conventional image scanning device.
Figure 2:
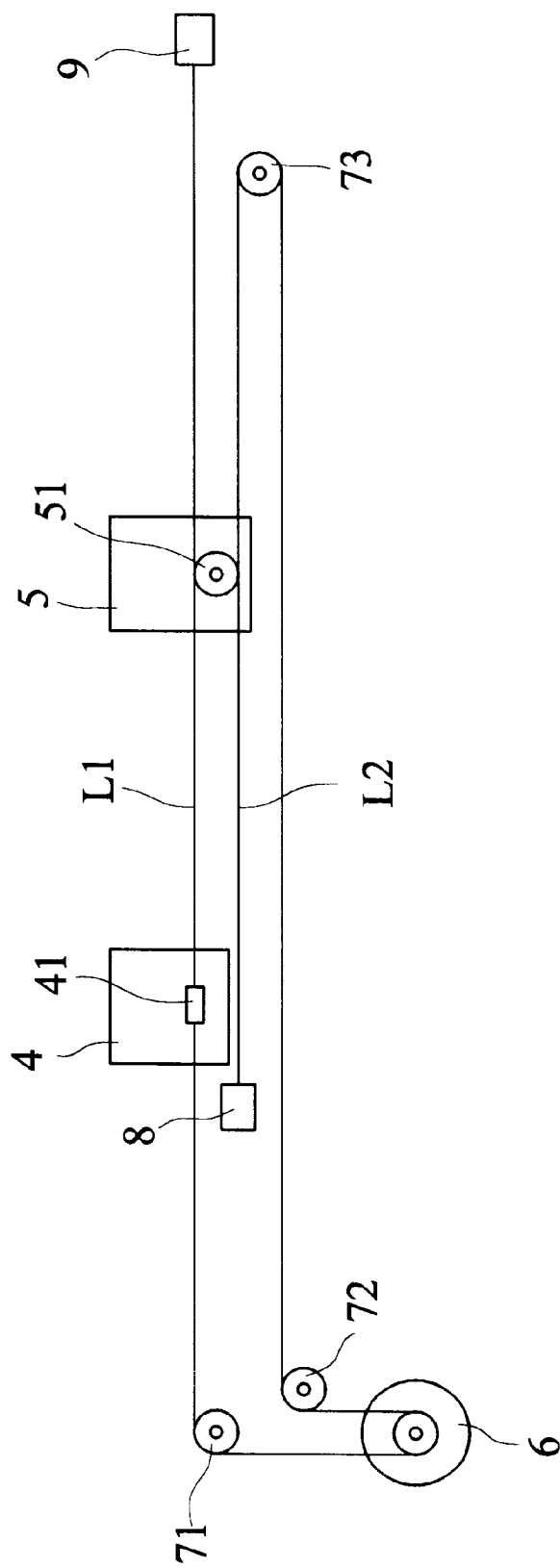
FIG. 2 is a plane view showing the transmission rope and the transmission mechanism therefor of the conventional image scanning device of FIG. 1.
Figure 3:
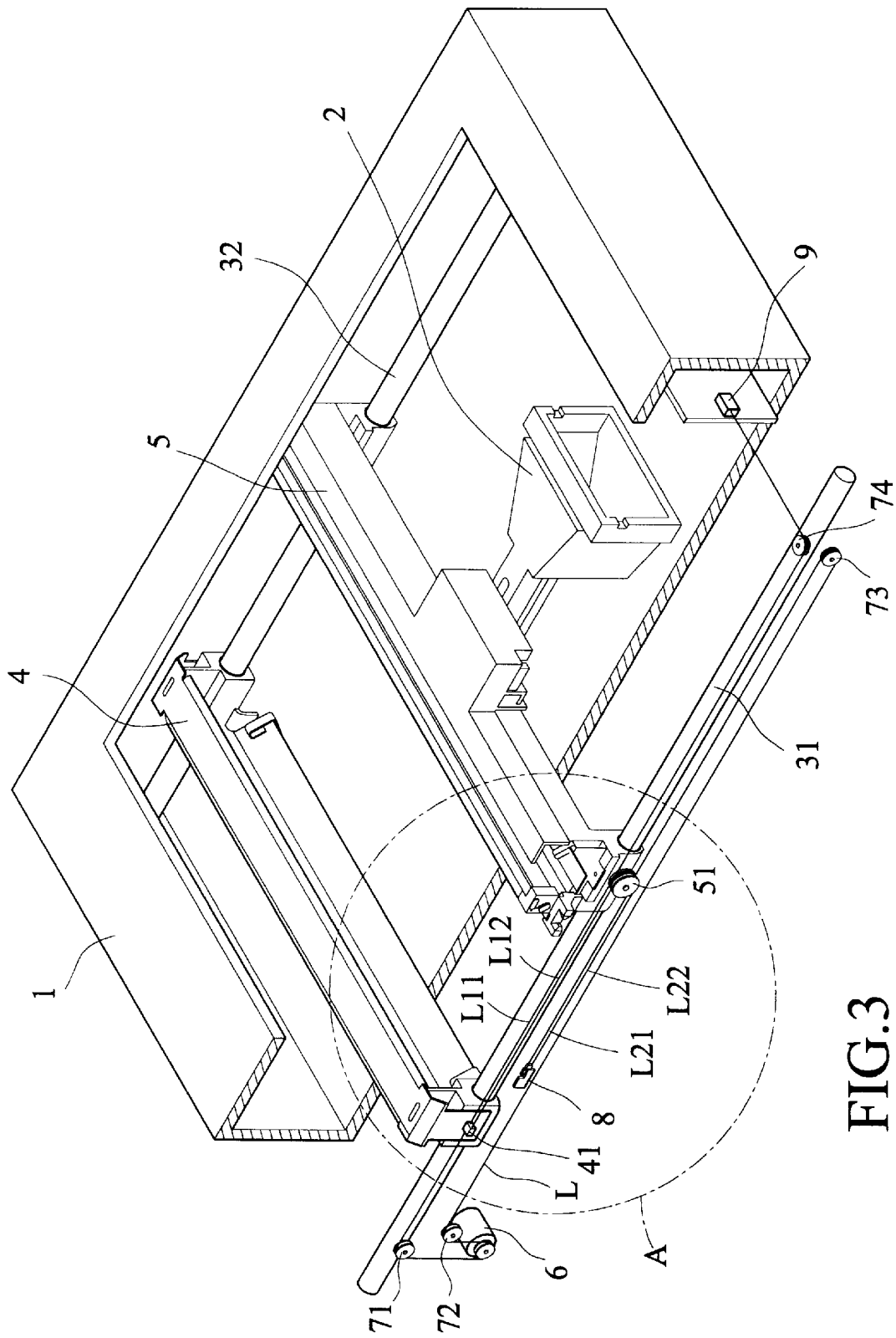
FIG. 3 is a perspective view showing the arrangement of the respective main components of the image scanning device of the present invention.

Please refer to FIG. 3 which shows the application of the present invention to an image scanning device, wherein the same components as those of FIG. 1 are denoted with the same reference numerals.

As shown in FIG. 3, the image scanning device 1 includes a focusing lens 2, a left and a right corresponding guide rods 31, 32 and a first and a second movable mirror modules 4, 5 movable along the guide rods 31, 32.

The movable mirror modules 4, 5 can be driven and moved by a transmission mechanism through a transmission rope L. One end of the transmission rope L is located at a locating member 8 which may be fixed at a suitable position of an inner side wall of the casing of the image scanning device 1.

The transmission rope L is first wound on a guide wheel 51 of the second movable mirror module 5 and then held by a rope holder 41 mounted on an end portion of the first movable mirror module 4. Thereafter, the transmission rope L sequentially travels through a first auxiliary guide wheel 71, a driving motor 6, a second auxiliary guide wheel 72 and a third auxiliary guide wheel 73 and then travels back onto the guide wheel 51 of the second movable mirror module 5. Finally, the transmission rope L travels through a fourth auxiliary guide wheel 74 and then fixed at a tension adjuster 9 which may be positioned on an inner side wall of the casing of the image scanning device or other suitable position. In such arrangement, when the driving motor 6 operates, via the transmission rope L, the first and second movable mirror modules 4, 5 can be driven to move at a predetermined displacement ratio.

Figure 4:
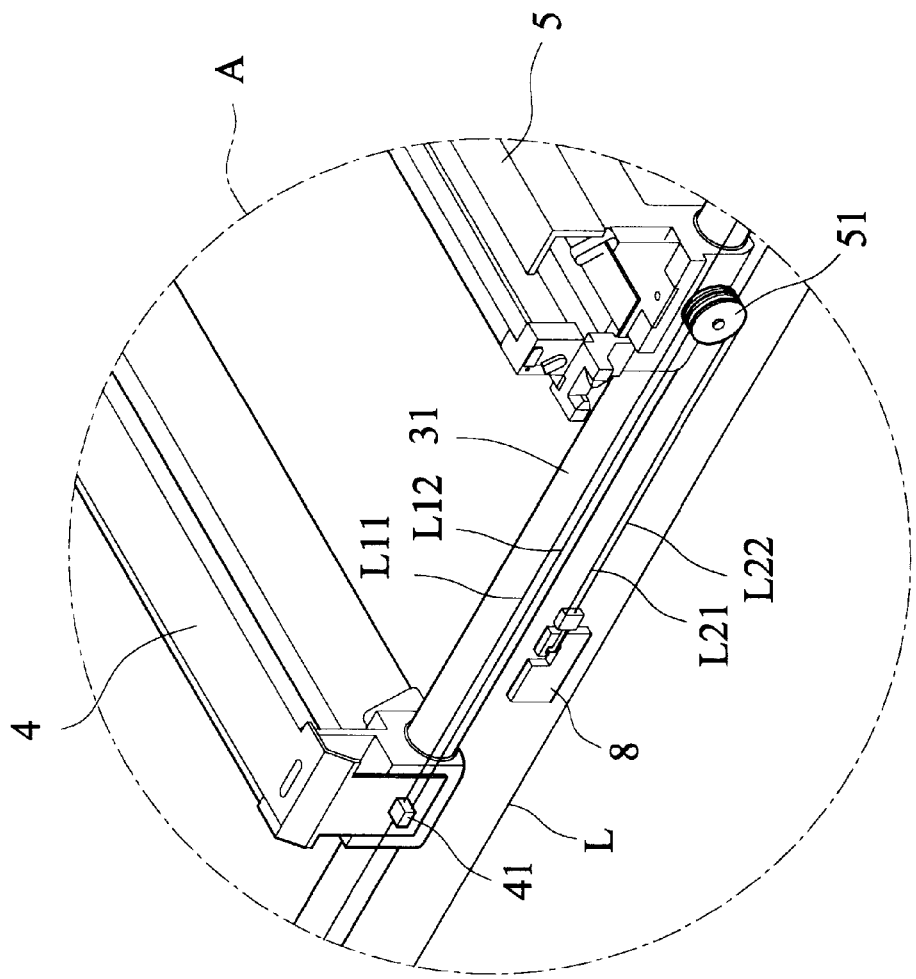
FIG. 4 is an enlarged view taken from FIG. 3, showing the transmission rope structure between the first and second movable mirror modules according to a first embodiment of the present invention.
Figure 5:
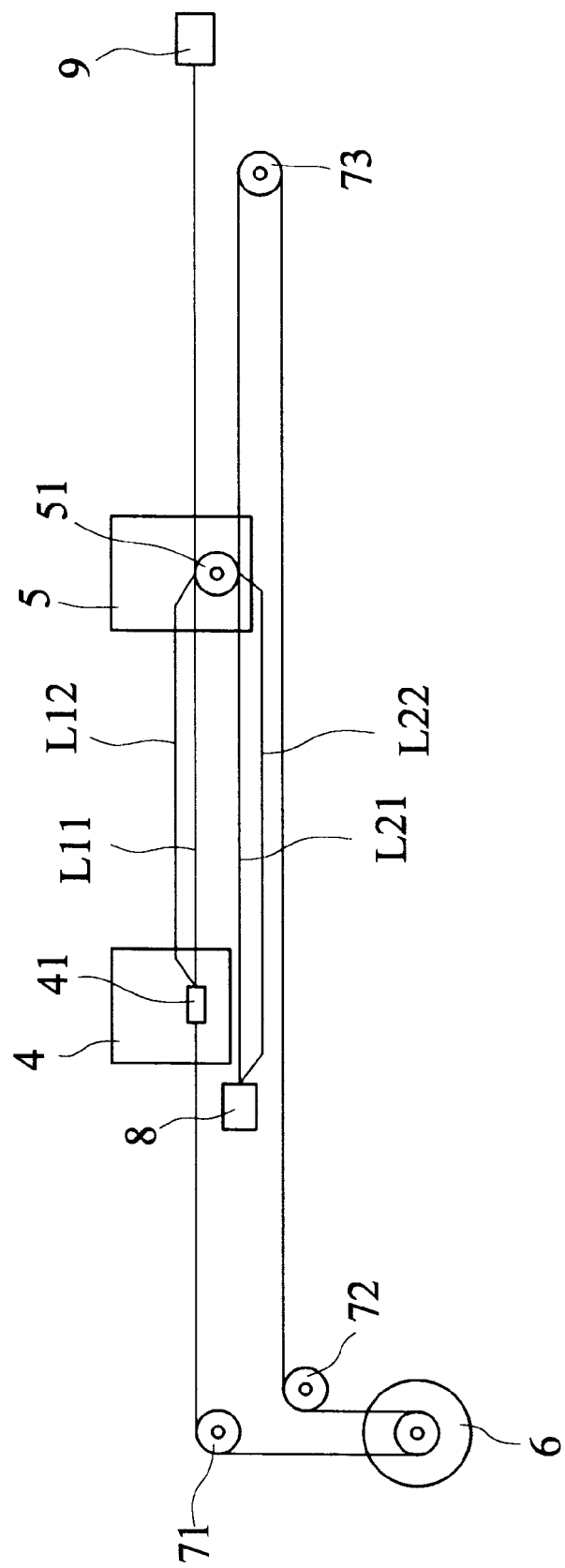
FIG. 5 is a plane view showing the transmission rope structure according to the first embodiment of the present invention.

FIG. 4 is an enlarged view of the circle portion A of FIG. 3, showing the transmission rope structure between the first and second movable mirror modules 4, 5. FIG. 5 is a plane view showing the arrangement of the transmission rope structure of FIG. 3.

According to the first embodiment of the present invention, the section between the rope holder 41 of the first movable mirror module 4 and the guide wheel 51 of the second movable mirror module 5 includes two rope sections L11, L12. After wound on the guide wheel 51 of the second movable mirror module 5, the two rope sections L11, L12 respectively extend to form two transmission rope sections L21, L22 between the guide wheel 51 and the locating member 8.

That is, in the transmission rope structure of the present invention, between the rope holder 41 of the first movable mirror module 4 and the guide wheel 51 of the second movable mirror module 5 and between the guide wheel 51 of the second movable mirror module 5 and the locating member 8, two transmission ropes are used instead of the single rope structure of the conventional transmission rope structure. Accordingly, when driving the first and second movable mirror modules 4, 5, the section formed by two transmission ropes serves to provide better tensile strength so as to minimize the length deformation of the transmission rope.

Figure 6:
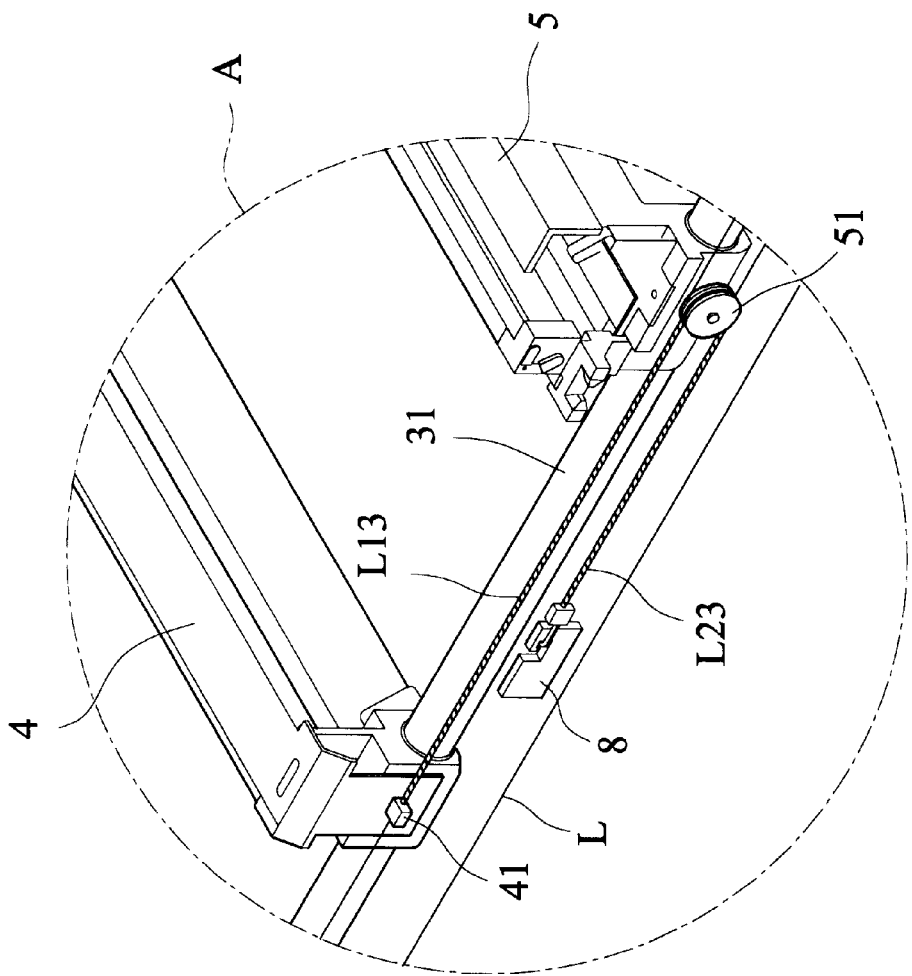
FIG. 6 is an enlarged view taken from FIG. 3, showing the transmission rope structure between the first and second movable mirror modules according to a second embodiment of the present invention.
Figure 7:
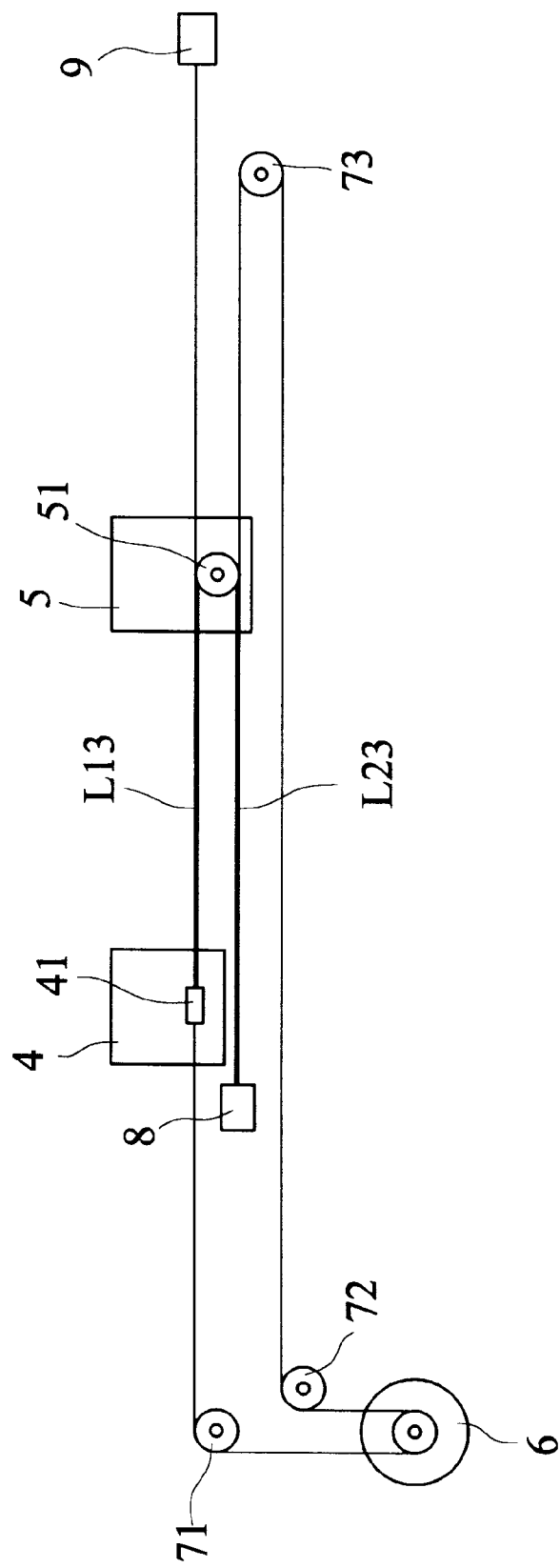
FIG. 7 is a plane view showing the transmission rope structure according to the second embodiment of the present invention.

FIG. 6 is an enlarged view showing the transmission rope structure between the first and second movable mirror modules 4, 5 in accordance with the second embodiment of the present invention. FIG. 7 is a plane view showing the transmission rope structure of the second embodiment.

Most of structures of the second embodiment of the present invention are identical to those of the first embodiment. The difference therebetween resides in that the sections L13, L23 between the rope holder 41 of the first movable mirror module 4 and the guide wheel 51 of the second movable mirror module 5 of the transmission rope L have a diameter larger than that of the other section of the transmission rope for providing a better tensile strength. By means of such structure of this embodiment, the length deformation of the transmission rope can be also minimized.

The improved transmission rope of the present invention described above can effectively minimize the tension strain of the transmission rope during driving the movable mirror modules. Therefore, a high quality image scanning effect can be achieved.

The above embodiments are only used to illustrate the present invention, not intended to limit the scope thereof. Many modifications of the above embodiments can be made without departing from the spirit of the present invention.

What is claimed is:

1. An image scanning device, comprising:

two guide rods arranged in the image scanning device;

a first movable mirror module provided with a rope holder;

a second movable mirror module provided with a guide wheel;

a transmission mechanism comprising a driving motor, a number of auxiliary guide wheels for moving the first movable mirror module and the second movable mirror module along the guide rods;

a transmission rope, one end of the transmission rope being fixed at a first locating point in the image scanning device, and the other end of the transmission rope being first wound on the guide wheel of the second movable mirror module and then held by the rope holder of the first movable mirror module and then sequentially traveled through the auxiliary guide wheels and the driving motor and then wound back onto the guide wheel of the second movable mirror module and finally fixed at a second locating point in the image scanning device; and a section of the transmission rope between the rope holder of the first movable mirror module and the guide wheel of the second movable mirror module and between the guide wheel of the second movable mirror module and the first locating point being formed by two transmission ropes.

2. An image scanning device, comprising:

two guide rods arranged in the image scanning device;

a first movable mirror module provided with a rope holder;

a second movable mirror module provided with a guide wheel;

a transmission mechanism comprising a driving motor, a number of auxiliary guide wheels for moving the first movable mirror module and the second movable mirror module along the guide rods;

a transmission rope, one end of the transmission rope being fixed at a first locating point in the image scanning device, and the other end of the transmission rope being first wound on the guide wheel of the second movable mirror module and then held by the rope holder of the first movable mirror module and then sequentially traveled through the auxiliary guide wheels and the driving motor and then wound back onto the guide wheel of the second movable mirror module and finally fixed at a second locating point in the image scanning device; and a section of the transmission rope between the rope holder of the first movable mirror module and the guide wheel of the second movable mirror module and between the guide wheel of the second movable mirror module and the first locating point having a diameter larger than that of the other section of the transmission rope.

* * * * *